United States Patent
Immordino et al.

(10) Patent No.: US 8,323,429 B2
(45) Date of Patent: Dec. 4, 2012

(54) METHOD FOR PREPARING THREE-DIMENSIONAL PLASTER OBJECTS

(75) Inventors: Salvatore C. Immordino, Trevor, WI (US); Lee K. Yeung, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 290 days.

(21) Appl. No.: 12/533,774

(22) Filed: Jul. 31, 2009

(65) Prior Publication Data

US 2011/0024028 A1 Feb. 3, 2011

(51) Int. Cl.
  B29C 65/00 (2006.01)
  B32B 13/00 (2006.01)
  B32B 37/00 (2006.01)
  B29C 47/00 (2006.01)
  B05D 1/36 (2006.01)
  B05D 5/00 (2006.01)

(52) U.S. Cl. ............... 156/39; 156/244.11; 427/265

(58) Field of Classification Search ............... 156/39, 156/244.11; 427/265
  See application file for complete search history.

(56) References Cited

U.S. PATENT DOCUMENTS

| | | |
|---|---|---|
| 4,247,508 A | 1/1981 | Housholder |
| 4,369,025 A | 1/1983 | von der Weid |
| 4,942,003 A | 7/1990 | Bold |
| 5,155,324 A | 10/1992 | Deckard et al. |
| 5,204,055 A | 4/1993 | Sachs et al. |
| 5,296,062 A | 3/1994 | Bourell et al. |
| 5,340,656 A | 8/1994 | Sachs et al. |
| 5,352,405 A | 10/1994 | Beaman et al. |
| 5,387,380 A | 2/1995 | Cima et al. |
| 5,485,499 A | 1/1996 | Pew et al. |
| 5,490,962 A | 2/1996 | Cima et al. |
| 5,518,680 A | 5/1996 | Cima et al. |
| 5,534,059 A | 7/1996 | Immordino et al. |
| 5,639,402 A | 6/1997 | Barlow et al. |
| 5,775,912 A | 7/1998 | Panzera et al. |
| 5,824,260 A | 10/1998 | Sauerhoefer |
| 5,851,465 A | 12/1998 | Bredt |
| 5,902,441 A | 5/1999 | Bredt et al. |
| 5,976,448 A | 11/1999 | Haruta et al. |
| 6,177,034 B1 | 1/2001 | Ferrone |
| 6,193,923 B1 | 2/2001 | Leyden et al. |
| 6,270,335 B2 | 8/2001 | Leyden et al. |
| 6,273,345 B1 | 8/2001 | Kaligian, II et al. |
| 6,354,836 B1 | 3/2002 | Panzera et al. |
| 6,355,099 B1 | 3/2002 | Immordino et al. |
| 6,364,986 B1 | 4/2002 | Kieronski |
| 6,379,458 B1 | 4/2002 | Immordino et al. |
| 6,401,002 B1 | 6/2002 | Jang et al. |
| 6,409,823 B1 | 6/2002 | Shake et al. |
| 6,462,103 B1 | 10/2002 | Beitelshees et al. |
| 6,497,574 B1 | 12/2002 | Miller |
| 6,508,971 B2 | 1/2003 | Leyden et al. |
| 6,596,224 B1 | 7/2003 | Sachs et al. |
| 6,610,429 B2 | 8/2003 | Bredt et al. |
| 6,660,209 B2 | 12/2003 | Leyden et al. |
| 6,808,659 B2 | 10/2004 | Schulman et al. |
| 6,821,462 B2 | 11/2004 | Schulman et al. |
| 6,822,033 B2 | 11/2004 | Yu et al. |
| 7,011,522 B2 | 3/2006 | Panzera et al. |
| 7,077,638 B2 | 7/2006 | Leyden et al. |
| 7,087,109 B2 | 8/2006 | Bredt et al. |
| 7,118,375 B2 | 10/2006 | Durbin et al. |
| 7,255,825 B2 | 8/2007 | Nielsen et al. |
| 7,291,364 B2 | 11/2007 | Faulkner et al. |
| 7,332,537 B2 | 2/2008 | Bredt et al. |
| 7,348,075 B2 | 3/2008 | Farr et al. |
| 7,374,611 B2 | 5/2008 | Lettkeman et al. |
| 7,384,266 B2 | 6/2008 | Wen |
| 7,410,606 B2 | 8/2008 | Appleby et al. |
| 2002/0125592 A1 | 9/2002 | Schulman et al. |
| 2004/0038009 A1 | 2/2004 | Leyden et al. |
| 2005/0023710 A1 | 2/2005 | Brodkin et al. |
| 2005/0064745 A1 | 3/2005 | Zhang |
| 2005/0110177 A1 | 5/2005 | Schulman et al. |
| 2005/0212163 A1 | 9/2005 | Bausinger et al. |
| 2006/0263738 A1 | 11/2006 | Kuo |

FOREIGN PATENT DOCUMENTS

| | | |
|---|---|---|
| EP | 1270184 A1 | 2/2003 |
| EP | 1 491 517 A2 | 12/2004 |
| EP | 1 510 310 A1 | 3/2005 |
| EP | 1 527 861 A2 | 5/2005 |
| EP | 2 011 774 A1 | 1/2009 |
| WO | WO2004037902 | 5/2004 |
| WO | WO 2008/086033 A1 | 7/2008 |

OTHER PUBLICATIONS

European Patent Office, International Search Report from International PCT Application No. PCT/US2010/042531 (Oct. 26, 2010).

Primary Examiner — Michael Orlando

(74) Attorney, Agent, or Firm — Pradip K. Sahu; David E. Janci; Leydig, Voigt & Mayer

(57) ABSTRACT

The present invention relates to a method for producing three-dimensional plaster objects via thin layer deposition. The inventive method comprises steps of depositing a layer of a calcium sulfate hemihydrate slurry onto the surface of a support in a predetermined pattern and activating the slurry with an activating agent so as to accelerate the setting reaction of calcium sulfate hemihydrate and water to form set calcium sulfate dihydrate. The depositing and activating steps can be repeated as necessary until the desired three-dimensional plaster object is formed.

10 Claims, No Drawings

METHOD FOR PREPARING THREE-DIMENSIONAL PLASTER OBJECTS

FIELD OF THE INVENTION

The present invention relates to a method for producing a three-dimensional plaster object.

BACKGROUND OF THE INVENTION

Gypsum is a common material that is widely employed in the building industry for a number of uses. The usefulness of gypsum is due, at least in part, to its reasonable cost and the ability to form it into substantially any shape. Gypsum is also known as calcium sulfate dihydrate, terra alba, or landplaster and is generally produced by mining or isolation from flue gas desulfurization processes occurring at power plants. In its raw form, gypsum is found as a dihydrate and has approximately two water molecules associated with each molecule of calcium sulfate.

Generally, gypsum-containing products are prepared by forming a slurry of calcined gypsum (calcium sulfate hemihydrate and/or calcium sulfate anhydrite) and water, and optionally other components, as desired. Typically, as its name suggests, calcined gypsum is produced by calcining calcium sulfate dihydrate to drive off some of the water of hydration. To form a three-dimensional plaster object, the calcined gypsum slurry typically is cast into a pre-determined shape or applied onto the surface of a substrate where it can be machined into a pre-determined shape. Once cast or applied to a substrate, the calcined gypsum reacts with the water to form a matrix of crystalline hydrated gypsum. It is this hydration that enables the formation of an interlocking matrix of set gypsum, thereby imparting strength to the plaster product. Mild heating can be used to drive off any unreacted water to yield a dry product.

While castable and/or sprayable plaster compositions have been used in the prior art to produce three-dimensional objects, such methods are often not ideal. For example, cast plaster objects cannot readily be formed into complex three-dimensional shapes. The casting process also requires special tooling such as molds and dies and it can be a slow and cumbersome method for the production of three-dimensional objects. In addition, plaster objects are often subjected to sustained elevated temperatures (e.g., 140° F. or higher) during the casting process. This can be problematic because many conventional plaster compositions are thermally and dimensionally unstable to some degree. More specifically, surface re-calcination of the set gypsum can occur at elevated temperatures, thereby resulting in a loss of strength due to a weakened set gypsum matrix.

Similarly, sprayable plaster compositions cannot readily be formed into complex three-dimensional shapes (e.g., shapes with internal structure) due to the requisite substrate coating and machining processes. In this regard, sprayable plaster compositions require laborious and inefficient manufacturing steps before even rudimentary three-dimensional objects can be produced. In particular, a substrate must first be fabricated that is similarly shaped but slightly smaller than the desired full-size object. The substrate can then be coated with a sprayable plaster composition to form a substrate/plaster combination which is larger than the desired full-size object. Finally, the coated substrate must then be machined (e.g., cut, milled, lathed, sanded, etc.) into the desired shape. As such, a large quantity of the plaster material is unavoidably wasted as plaster dust and/or shavings during the manufacturing process.

Accordingly, there remains a need for improved methods for the production of three-dimensional plaster objects that address the shortcomings of the processes discussed above and known in the prior art. The present invention provides such methods. These and other advantages of the invention, as well as additional inventive features, will be apparent from the description of the invention provided herein.

BRIEF SUMMARY OF THE INVENTION

The present invention provides a method for producing a three-dimensional object comprising multiple thin layers of plaster. More specifically, the inventive method comprises the following steps: (a) depositing a first layer of a calcium sulfate hemihydrate slurry onto the surface of a support substrate in a predetermined pattern, (b) activating the first layer of the calcium sulfate hemihydrate slurry with an activating agent, (c) depositing a second layer of the calcium sulfate hemihydrate slurry onto the surface of the activated calcium sulfate hemihydrate slurry of step (b) in a predetermined pattern, and (d) activating the second layer of the calcium sulfate hemihydrate slurry with an activating agent. The activating agents employed in steps (b) and (c) can be the same or different and are present in an amount sufficient to accelerate the setting reaction of calcium sulfate hemihydrate and water to form set calcium dihydrate in each layer.

In one aspect of the present invention, the plaster object provided above is expanded upon by further repeating steps (c) and (d) one or more times to form one or more additional layers until the desired three-dimensional plaster object is formed. In certain aspects of the present invention, the three-dimensional plaster object formed is removed from the support substrate used in step (a).

DETAILED DESCRIPTION OF THE INVENTION

The present invention is directed to a method for producing a three-dimensional plaster object via thin layer deposition. The inventive method is useful for producing any tangible, three-dimensional plaster object such as a prototype part, model, working tool, production part, cast, mold, or the like, as desired. Identifying such applications is well within the ordinary skill in the art. As used herein, and as generally understood in the art, the term "plaster" refers to a calcium sulfate based composition.

In accordance with the present invention, a three-dimensional plaster object can be produced with increased resolution and greater control of fine details as the object is built up using relatively thin layers. The present invention surprisingly allows for the deposit of thin layers of a calcium sulfate hemihydrate slurry without resulting in accuracy and efficiency problems. In this respect, the inventive method avoids the problems of the prior art, wherein the setting reaction of calcium sulfate hemihydrate to calcium sulfate dihydrate becomes increasingly difficult to control as layers of a calcium sulfate hemihydrate slurry become thinner. For example, in the methods of the prior art, the slurry can set too rapidly (e.g., in the piping of a spray apparatus) thus resulting in a layer which is not accurately deposited into the desired shape. Similarly, in the methods of the prior art, the slurry can set too slowly, thus resulting in a thin layer which will not hold its shape long enough to accurately form the desired shape. Thus, the present invention is premised, at least in part, on the surprising and unexpected discovery that the setting reaction of thin layers of a calcium sulfate hemihydrate slurry can be effectively controlled such that the layers can be repetitively deposited and activated to build up a three-dimensional plaster object. Thin layer deposition in accordance with the present invention allows for the efficient production of three-dimensional plaster objects which can have highly detailed or complex structures.

In addition, the method of the present invention as set forth herein provides for the rapid formation of detailed three-dimensional plaster objects without the need for the complicated molding and/or casting processes described above. The inventive method also does not require a specialized or shaped substrate, as required by the sprayable plaster compositions of the prior art. In addition, very little to no waste is generated by the method described herein because the calcium sulfate hemihydrate slurry is deposited in a predetermined and controlled fashion, thus eliminating the need to machine the set plaster product after formation.

In one aspect of the present invention, the method comprises: (a) depositing a first layer of a calcium sulfate hemihydrate slurry onto the surface of a support substrate in a predetermined pattern, (b) activating the first layer of the calcium sulfate hemihydrate slurry with at least one first activating agent, (c) depositing a second layer of the calcium sulfate hemihydrate slurry onto the surface of the activated calcium sulfate hemihydrate slurry of step (b) in a predetermined pattern, and (d) activating the second layer of the calcium sulfate hemihydrate slurry with at least one second activating agent. A three-dimensional plaster object produced in accordance with this aspect of the invention will be formed of two layers of plaster.

In another aspect of the inventive method, the abovementioned steps (c) and (d) are optionally repeated one or more times to form one or more additional layers. In this aspect of the invention, the depositing and activating steps are repeated until the desired three-dimensional plaster object is formed. One of ordinary skill in the art will readily recognize the desired number of layers. For example, the desired number of layers will depend on the size of the final three-dimensional plaster object, the thickness of each layer of calcium sulfate hemihydrate slurry, etc.

The layers of calcium sulfate hemihydrate slurry deposited in steps (a) and (c), above, can be the same or different. Likewise, each of the optional additional layers of calcium sulfate hemihydrate slurry discussed above can be the same or different. The calcium sulfate hemihydrate slurry employed in the present invention comprises at least calcium sulfate hemihydrate particles and water and, optionally, any other desired additives. The calcium sulfate hemihydrate can be of any suitable form such that the present method can be carried out. In particular, either alpha-calcium sulfate hemihydrate ($\alpha$-CaSO$_4$.½H$_2$O) or beta-calcium sulfate hemihydrate ($\beta$-CaSO$_4$.½H$_2$O) can be used in the slurry. The alpha form of calcium sulfate hemihydrate is less acicular in shape than the beta version. The less acicular shape allows the particles to wet out and flow better when mixed with water. The lower water demand of the alpha form results in a more closely packed and higher density composite in comparison to the resultant interlocking matrix of beta-calcium sulfate hemihydrate. In some embodiments, a combination of alpha and/or beta-calcium sulfate hemihydrate is used to control the amount of water needed to form a workable slurry. When used in conjunction with the present invention, such combination of hemihydrates can be used to adjust and set a desired density of the final three-dimensional plaster object.

Whether alpha or beta-calcium sulfate hemihydrate, or a combination of both, is selected for a particular application depends on a number of factors. In one aspect, beta-calcined gypsum is often used where cost is a primary concern. However, in some aspects, where water addition is minimized for strength and density, the alpha form is employed. In accordance with the present invention, alpha-calcium sulfate hemihydrate, beta-calcium sulfate hemihydrate, or mixtures thereof can be selected to adjust for desired characteristics in the process or end-product, as will be within the ordinary skill in the art.

In one aspect of the present invention, the calcium sulfate hemihydrate slurry includes up to about 80 weight-percent of the calcium sulfate hemihydrate particles. For example, in some embodiments, the calcium sulfate hemihydrate particles are present in the slurry up to about 75 weight-percent, 70 weight-percent, 65 weight-percent, 60 weight-percent, 55 weight-percent, 50 weight-percent, 45 weight-percent, or 40 weight-percent. In another aspect, the calcium sulfate hemihydrate slurry includes about 40 to about 80 weight-percent of the calcium sulfate hemihydrate particles, such as about 40 to about 75 weight-percent, about 40 to about 70 weight-percent, about 40 to about 65 weight-percent, about 40 to about 60 weight-percent, about 40 to about 55 weight-percent, about 40 to about 50 weight-percent, about 40 to about 45 weight-percent, about 45 to about 75 weight-percent, about 45 to about 70 weight-percent, about 45 to about 65 weight-percent, about 45 to about 60 weight-percent, about 45 to about 55 weight-percent, about 45 to about 50 weight-percent, about 50 to about 75 weight-percent, about 50 to about 70 weight-percent, about 50 to about 65 weight-percent, about 50 to about 60 weight-percent, about 50 to about 55 weight-percent, about 55 to about 75 weight-percent, about 55 to about 70 weight-percent, about 55 to about 65 weight-percent, about 55 to about 60 weight-percent, about 60 to about 75 weight-percent, about 60 to about 70 weight-percent, about 60 to about 65 weight-percent, about 65 to about 75 weight-percent, about 65 to about 70 weight-percent, or about 70 to about 75 weight-percent.

The water used in the calcium sulfate hemihydrate slurry preferably should be as pure as practicable so as to reduce contamination by impurities. Organic impurities tend to lengthen set time. Inorganic impurities tend to form salts which, during set, migrate to the surface of the layers, thus forming imperfections and hard spots. In addition, the water temperature preferably should not exceed 110° F., to enhance the hydration of calcium sulfate hemihydrate to form calcium sulfate dihydrate. Approaching this temperature otherwise would lead to a decrease in compressive strength in the resultant crystal formation.

The depositing steps (i.e., abovementioned steps (a) and (c)) of the present invention can be carried out by any suitable method such that the calcium sulfate hemihydrate slurry is deposited in the desired predetermined pattern, which will be well within the ordinary skill in the art. In one aspect, the depositing steps (a) and (c) comprise depositing the calcium sulfate hemihydrate slurry using a manual deposition process, an extrusion deposition process, a controlled spraying deposition process, or any combination thereof.

The manual deposition process can be any suitable manual technique known in the art such that the calcium sulfate hemihydrate slurry is deposited in the desired predetermined pattern. Exemplary manual deposition techniques include application of the calcium sulfate hemihydrate slurry using a trowel, knife, spatula, brush, or float.

The extrusion deposition process can be any suitable extrusion technique known in the art such that the calcium sulfate hemihydrate slurry is deposited in the desired predetermined pattern. The extrusion process may be continuous or semi-continuous and may be performed with the calcium sulfate hemihydrate slurry warmed, cooled, or at room temperature. For example, relative to room temperature, a cooled slurry can be used when a slower setting reaction is required and a warmed slurry can be used when a faster setting reaction is required. In one aspect of the present invention, the extrusion process is a thin film extrusion process or a cannulated needle extrusion process.

The controlled spraying deposition process can be any suitable controlled spraying technique known in the art such that the calcium sulfate hemihydrate slurry is deposited in the desired predetermined pattern. In one aspect of the present invention, the controlled spraying deposition process is a print head process. Exemplary print head processes useful in the inventive method include free-form fabrication techniques wherein the calcium sulfate hemihydrate slurry is dispensed by any number of inkjet-type print heads attached to a moveable carriage. The moveable carriage may be controlled by a computing device having a user interface and may be controllably moved by, for example, a shaft system, a belt system, a chain system, etc. Such free-form fabrication systems are well known in the art and may include, for example, commercially available PROJET (3D Systems, Inc., Rock Hill, S.C.) and ZPRINTER (Z Corporation, Burlington, Mass.) systems.

In another aspect of the present invention, the controlled spraying deposition process is a spray head spraying process, wherein the calcium sulfate hemihydrate slurry is deposited using any suitable spray apparatus known in the art. Exemplary spray apparatus include plaster spray guns such as those disclosed in U.S. Pat. Nos. 6,273,345 and 6,355,099, both of which are herein incorporated by reference. Such spray gun systems generally atomize plaster slurries to provide increased sprayability, uniform distribution, and even application. In one aspect of the present invention, the calcium sulfate hemihydrate slurry is deposited using a spray head spraying process driven by air pressure, slurry pressure, or a combination thereof.

The calcium sulfate hemihydrate slurry layers can be deposited in any suitable thickness provided that the predetermined pattern is followed. The layers of calcium sulfate hemihydrate slurry can have the same or different thickness. In one aspect of the present invention, the layers of calcium sulfate hemihydrate slurry can be deposited in a thickness of up to about 5.0 mm (for example, up to about 4.5 mm, 4.0 mm, 3.5 mm, 3.0 mm, 2.5 mm, 2.0 mm, 1.5 mm, 1.0 mm, 0.5 mm, 0.25 mm, 0.1 mm, 0.05 mm, 0.025 mm, or 0.01 mm). In another aspect, the layers of calcium sulfate hemihydrate slurry can be deposited in a thickness of about 0.01 mm to about 5.0 mm, about 0.05 mm to about 2.5 mm, or about 0.01 mm to about 1.0 mm. For example, about 0.01 mm to about 4.5 mm, about 0.01 mm to about 4.0 mm, about 0.01 mm to about 3.5 mm, about 0.01 mm to about 3.0 mm, about 0.01 mm to about 2.5 mm, about 0.01 mm to about 2.0 mm, about 0.01 mm to about 1.5 mm, about 0.01 mm to about 1.0 mm, about 0.01 mm to about 0.5 mm, about 0.01 mm to about 0.25 mm, about 0.01 mm to about 0.1 mm, about 0.01 mm to about 0.05 mm, about 0.01 mm to about 0.025 mm, about 0.025 mm to about 4.5 mm, about 0.025 mm to about 4.0 mm, about 0.025 mm to about 3.5 mm, about 0.025 mm to about 3.0 mm, about 0.025 mm to about 2.5 mm, about 0.025 mm to about 2.0 mm, about 0.025 mm to about 1.5 mm, about 0.025 mm to about 1.0 mm, about 0.025 mm to about 0.5 mm, about 0.025 mm to about 0.25 mm, about 0.025 mm to about 0.1 mm, about 0.025 mm to about 0.05 mm, about 0.05 mm to about 4.5 mm, about 0.05 mm to about 4.0 mm, about 0.05 mm to about 3.5 mm, about 0.05 mm to about 3.0 mm, about 0.05 mm to about 2.5 mm, about 0.05 mm to about 2.0 mm, about 0.05 mm to about 1.5 mm, about 0.05 mm to about 1.0 mm, about 0.05 mm to about 0.5 mm, about 0.05 mm to about 0.25 mm, about 0.05 mm to about 0.1 mm, about 0.1 mm to about 4.5 mm, about 0.1 mm to about 4.0 mm, about 0.1 mm to about 3.5 mm, about 0.1 mm to about 3.0 mm, about 0.1 mm to about 2.5 mm, about 0.1 mm to about 2.0 mm, about 0.1 mm to about 1.5 mm, about 0.1 mm to about 1.0 mm, about 0.1 mm to about 0.5 mm, about 0.1 mm to about 0.25 mm, about 0.25 mm to about 4.5 mm, about 0.25 mm to about 4.0 mm, about 0.25 mm to about 3.5 mm, about 0.25 mm to about 3.0 mm, about 0.25 mm to about 2.5 mm, about 0.25 mm to about 2.0 mm, about 0.25 mm to about 1.5 mm, about 0.25 mm to about 1.0 mm, about 0.25 mm to about 0.5 mm, about 0.5 mm to about 4.5 mm, about 0.5 mm to about 4.0 mm, about 0.5 mm to about 3.5 mm, about 0.5 mm to about 3.0 mm, about 0.5 mm to about 2.5 mm, about 0.5 mm to about 2.0 mm, about 0.5 mm to about 1.5 mm, about 0.5 mm to about 1.0 mm, about 1.0 mm to about 4.5 mm, about 1.0 mm to about 4.0 mm, about 1.0 mm to about 3.5 mm, about 1.0 mm to about 3.0 mm, about 1.0 mm to about 2.5 mm, about 1.0 mm to about 2.0 mm, about 1.0 mm to about 1.5 mm, about 1.5 mm to about 4.5 mm, about 1.5 mm to about 4.0 mm, about 1.5 mm to about 3.5 mm, about 1.5 mm to about 3.0 mm, about 1.5 mm to about 2.5 mm, about 1.5 mm to about 2.0 mm, about 2.0 mm to about 4.5 mm, about 2.0 mm to about 4.0 mm, about 2.0 mm to about 3.5 mm, about 2.0 mm to about 3.0 mm, about 2.0 mm to about 2.5 mm, about 2.5 mm to about 4.5 mm, about 2.5 mm to about 4.0 mm, about 2.5 mm to about 3.5 mm, about 2.5 mm to about 3.0 mm, about 3.0 mm to about 4.5 mm, about 3.0 mm to about 4.0 mm, about 3.0 mm to about 3.5 mm, about 3.5 mm to about 4.5 mm, about 3.5 mm to about 4.0 mm, or about 4.0 mm to about 4.5 mm.

In accordance with the present invention, the first layer of the calcium sulfate hemihydrate slurry is deposited onto the surface of a support substrate in a predetermined pattern. The support substrate can be any suitable substrate capable of supporting one or more layers of a calcium sulfate hemihydrate slurry before, during, and after the calcium sulfate hemihydrate slurry reacts/sets to form calcium sulfate dihydrate (i.e., set gypsum). In particular, the support substrate can be any build platform known in the art. Exemplary support substrates include wood, plastic, glass, styrofoam, fiberglass, stainless steel, wire mesh, wax, pulp paper products, and the like.

In one aspect of the present invention, the support substrate is any removable material which can be separated from the three-dimensional plaster object once it is formed. In another aspect of the invention, the support substrate is any material which can form a portion of the final three-dimensional plaster object and is not separated from the three-dimensional plaster object once it is formed. In this regard, the structure of the three-dimensional plaster object formed by the inventive method is governed by the predetermined pattern in which the calcium sulfate hemihydrate slurry is deposited. Accordingly, in some aspects, the support substrate need not have any particular shape. However, when the support substrate forms a portion of the final three-dimensional plaster object, the support substrate can optionally be shaped as desired.

As discussed above, the first layer of the calcium sulfate hemihydrate slurry is deposited onto the surface of a support substrate in a predetermined pattern. In this regard, the second and all subsequent layers of calcium sulfate hemihydrate slurry are deposited onto the surface of an activated calcium sulfate hemihydrate slurry. As used herein, the activated calcium sulfate hemihydrate slurry is any calcium sulfate hemihydrate slurry layer which has been treated and/or reacted with an activating agent. The activating agent is any agent which accelerates the setting reaction of calcium sulfate hemihydrate and water to form set calcium dihydrate. The activating agent desirably allows for the fine-tuning of set time in conjunction with deposition speed. Generally, the activating agent accelerates the setting reaction such that the thin layer of calcium sulfate hemihydrate maintains the desired shape and the time between subsequent layer deposition steps is minimized. The activating agent can be present in any amount sufficient to accelerate the setting reaction of calcium sulfate hemihydrate and water to form set calcium dihydrate. Similarly, the activating agent can be applied by any suitable method known in the art such that the activating agent can accelerate the setting reaction of calcium sulfate hemihydrate and water to form set calcium dihydrate.

The first and second activating agents employed in steps (b) and (d), respectively, of the inventive method can be the same or different. Likewise, each of the optional one or more additional layers of calcium sulfate hemihydrate slurry can be activated with an activating agent that is the same or different as the first and second activating agents. In this regard, the activating agent or agents can be any suitable agent or agents capable of accelerating the setting reaction of calcium sulfate hemihydrate and water to form set calcium dihydrate. Exemplary activating agents for use with the present invention are set forth in U.S. Pat. No. 6,379,458, which is herein incorporated by reference. In one aspect of the present invention, the activating agent or agents are aqueous solutions or slurries comprising at least one salt, wherein the cation of the at least one salt is selected from a group consisting of aluminum, zinc, iron, an alkali metal, and an alkaline earth metal. In another aspect, the anion of the at least one salt is sulfate or chloride. In yet another aspect, the at least one salt is selected from a group consisting of aluminum sulfate, zinc sulfate, sodium sulfate, potassium sulfate, and calcium sulfate.

In accordance with the method of the present invention, the depositing step and activating step for each successive layer of the calcium sulfate hemihydrate slurry are conducted sequentially, concurrently, or a combination thereof. When a depositing step and an activating step are conducted sequentially, the calcium sulfate hemihydrate slurry is deposited onto the surface of a support substrate or onto the surface of an activated calcium sulfate hemihydrate slurry before the activating agent is applied. In contrast, when a depositing step and an activating step are conducted concurrently, the calcium sulfate hemihydrate slurry is deposited onto the surface of a support substrate or onto the surface of an activated calcium sulfate hemihydrate slurry at the same time the activating agent is applied.

The calcium sulfate hemihydrate slurry may, optionally, further comprise a calcium sulfate hemihydrate set inhibitor. The set inhibitor can be included, for example, in situations when it is desirable to inactivate or slow the setting reaction of the calcium sulfate hemihydrate slurry. The set inhibitor can be any suitable set inhibitor which deactivates the setting reaction of calcium sulfate hemihydrate and water to form set calcium dihydrate. For example, the set inhibitor can be used in situations where it is desirable to fine-tune the set time of the calcium sulfate hemihydrate slurry such that the slurry does not set prematurely. The set inhibitor can further be used in situations where it is desirable to employ a premixed calcium sulfate hemihydrate slurry so as to avoid mixing of powders and water around sensitive equipment (e.g., a spray head or a print head), wherein dust contamination can be problematic. In one aspect of the present invention, the calcium sulfate hemihydrate set inhibitor is selected from a group consisting of sodium citrate, citric acid, tartaric acid, sodium tartrate, soya protein, a proteinaceous material such as casein, and combinations thereof. In another aspect, the calcium sulfate hemihydrate set inhibitor is selected from a group consisting of low molecular weight polymers or copolymers of vinyl acrylates, vinyl acetates, vinyl chlorides, ethylene, styrene, substituted ethylene, and substituted styrene, and polyphosphonic compounds, and combinations thereof. In yet another aspect, the calcium sulfate hemihydrate set inhibitor is a polyphosphonic compound selected from a group consisting of tetrasodiumpyrophosphate, tetrapotassiumpyrophosphate, hexamethylene diamine tetra(methylene phosphonic acid), and combinations thereof.

When present in the calcium sulfate hemihydrate slurry, the set inhibitor is present in any amount sufficient to deactivate the setting reaction of calcium sulfate hemihydrate and water to form set calcium dihydrate. In one aspect, the set inhibitor is present in an amount up to about 8.0 weight-percent of the calcium sulfate hemihydrate slurry. For example, the set inhibitor can be present in an amount up to about 7.5 weight-percent, 7.0 weight-percent, 6.5 weight-percent, 6.0 weight-percent, 5.5 weight-percent, 5.0 weight-percent, 4.5 weight-percent, 4.0 weight-percent, 3.5 weight-percent, 3.0 weight-percent, 2.5 weight-percent, 2.0 weight-percent, 1.5 weight-percent, 1.0 weight-percent, 0.5 weight-percent, 0.25 weight-percent, 0.1 weight-percent, 0.05 weight-percent, 0.025 weight-percent, or 0.01 weight-percent. In another aspect, the set inhibitor is present in an amount of about 0.01 to about 8.0 weight-percent or about 0.01 to about 2.00 weight-percent of the calcium sulfate hemihydrate slurry. For example, about 0.01 to about 7.5 weight-percent, about 0.01 to about 7.0 weight-percent, about 0.01 to about 6.5 weight-percent, about 0.01 to about 6.0 weight-percent, about 0.01 to about 5.5 weight-percent, about 0.01 to about 5.0 weight-percent, about 0.01 to about 4.5 weight-percent, about 0.01 to about 4.0 weight-percent, about 0.01 to about 3.5 weight-percent, about 0.01 to about 3.0 weight-percent, about 0.01 to about 2.5 weight-percent, about 0.01 to about 2.0 weight-percent, about 0.01 to about 1.5 weight-percent, about 0.01 to about 1.0 weight-percent, about 0.01 to about 0.5 weight-percent, about 0.01 to about 0.25 weight-percent, about 0.01 to about 0.1 weight-percent, about 0.01 to about 0.05 weight-percent, about 0.01 to about 0.025 weight-percent, about 0.025 to about 7.5 weight-percent, about 0.025 to about 7.0 weight-percent, about 0.025 to about 6.5 weight-percent, about 0.025 to about 6.0 weight-percent, about 0.025 to about 5.5 weight-percent, about 0.025 to about 5.0 weight-percent, about 0.025 to about 4.5 weight-percent, about 0.025 to about 4.0 weight-percent, about 0.025 to about 3.5 weight-percent, about 0.025 to about 3.0 weight-percent, about 0.025 to about 2.5 weight-percent, about 0.025 to about 2.0 weight-percent, about 0.025 to about 1.5 weight-percent, about 0.025 to about 1.0 weight-percent, about 0.025 to about 0.5 weight-percent, about 0.025 to about 0.25 weight-percent, about 0.025 to about 0.1 weight-percent, about 0.025 to about 0.05 weight-percent, about 0.05 to about 7.5 weight-percent, about 0.05 to about 7.0 weight-percent, about 0.05 to about 6.5 weight-percent, about 0.05 to about 6.0 weight-percent, about 0.05 to about 5.5 weight-percent, about 0.05 to about 5.0 weight-percent, about 0.05 to about 4.5 weight-percent, about 0.05 to about 4.0 weight-percent, about 0.05 to about 3.5 weight-percent, about 0.05 to about 3.0 weight-percent, about 0.05 to about 2.5 weight-percent, about 0.05 to about 2.0 weight-percent, about 0.05 to about 1.5 weight-percent, about 0.05 to about 1.0 weight-percent, about 0.05 to about 0.5 weight-percent, about 0.05 to about 0.25 weight-percent, about 0.05 to about 0.1 weight-percent, about 0.1 to about 7.5 weight-percent, about 0.1 to about 7.0 weight-percent, about 0.1 to about 6.5 weight-percent, about 0.1 to about 6.0 weight-percent, about 0.1 to about 5.5 weight-percent, about 0.1 to about 5.0 weight-percent, about 0.1 to about 4.5 weight-percent, about 0.1 to about 4.0 weight-percent, about 0.1 to about 3.5 weight-percent, about 0.1 to about 3.0 weight-percent, about 0.1 to about 2.5 weight-percent, about 0.1 to about 2.0 weight-percent, about 0.1 to about 1.5 weight-percent, about 0.1 to about 1.0 weight-percent, about 0.1 to about 0.5 weight-percent, about 0.1 to about 0.25 weight-percent, about 1.0 to about 7.5 weight-percent, about 1.0 to about 7.0 weight-percent, about 1.0 to about 6.5 weight-percent, about 1.0 to about 6.0 weight-percent, about 1.0 to about 5.5 weight-percent, about 1.0 to about 5.0 weight-percent, about 1.0 to about 4.5 weight-percent, about 1.0 to about 4.0 weight-percent, about 1.0 to about 3.5 weight-percent, about 1.0 to about 3.0 weight-percent, about 1.0 to about 2.5 weight-percent, about 1.0 to about 2.0 weight-percent, about 1.0 to about 1.5 weight-percent, about 1.5 to about 7.5 weight-percent, about 1.5 to about 7.0 weight-percent, about 1.5 to about 6.5 weight-percent, about 1.5 to about 6.0 weight-percent, about 1.5 to about 5.5 weight-percent, about 1.5 to about 5.0 weight-percent, about 1.5 to about 4.5 weight-percent, about 1.5 to about 4.0 weight-percent, about 1.5 to about 3.5 weight-percent, about 1.5 to about 3.0 weight-percent, about 1.5 to about 2.5 weight-percent, about 1.5 to about 2.0 weight-percent, about 2.0 to about 7.5 weight-percent, about 2.0 to about 7.0 weight-percent, about 2.0 to about 6.5 weight-percent, about 2.0 to about 6.0 weight-percent, about 2.0 to about 5.5 weight-percent, about 2.0 to about 5.0 weight-percent, about 2.0 to about 4.5 weight-percent, about 2.0 to about 4.0 weight-percent, about 2.0 to about 3.5 weight-percent, about 2.0 to about 3.0 weight-percent, about 2.0 to about 2.5 weight-percent, about 3.0 to about 7.5 weight-percent, about 3.0 to about 7.0 weight-percent, about 3.0 to about 6.5 weight-percent, about 3.0 to about 6.0 weight-percent, about 3.0 to about 5.5 weight-percent, about 3.0 to about 5.0 weight-percent, about 3.0 to about 4.5 weight-percent, about 3.0 to about 4.0 weight-percent, about 3.0 to about 3.5 weight-percent, about 3.5 to about 7.5 weight-percent, about 3.5 to about 7.0 weight-percent, about 3.5 to about 6.5 weight-percent, about 3.5 to about 6.0 weight-percent, about 3.5 to about 5.5 weight-percent, about 3.5 to about 5.0 weight-percent, about 3.5 to about 4.5 weight-percent, about 3.5 to about 4.0 weight-percent, about 4.0 to about 7.5 weight-percent, about 4.0 to about 7.0 weight-percent, about 4.0 to about 6.5 weight-percent, about 4.0 to about 6.0 weight-percent, about 4.0 to about 5.5 weight-percent, about 4.0 to about 5.0 weight-percent, about 4.0 to about 4.5 weight-percent, about 4.5 to about 7.5 weight-percent, about 4.5 to about 7.0 weight-percent, about 4.5 to about 6.5 weight-percent, about 4.5 to about 6.0 weight-percent, about 4.5 to about 5.5 weight-percent, about 4.5 to about 5.0 weight-percent, about 5.0 to about 7.5 weight-percent, about 5.0 to about 7.0 weight-percent, about 5.0 to about 6.5 weight-percent, about 5.0 to about 6.0 weight-percent, about 5.0 to about 5.5 weight-percent, about 5.5 to about 7.5 weight-percent, about 5.5 to about 7.0 weight-percent, about 5.5 to about 6.5 weight-percent, about 5.5 to about 6.0 weight-percent, about 6.0 to about 7.5 weight-percent, about 6.0 to about 7.0 weight-percent, about 6.0 to about 6.5 weight-percent, about 6.5 to about 7.5 weight-percent, about 6.5 to about 7.0 weight-percent, or about 7.0 to about 7.5 weight-percent.

The calcium sulfate hemihydrate slurry may, optionally, further comprise any number of additional additives depending upon the requirements of the final three-dimensional plaster object. Additives for a particular purpose, as well as the appropriate concentrations, are known to those of skill in the art. Exemplary additives include binders, inert fillers, defoamers, coloring agents, flow modifiers, water retainers, rheology modifiers, anti-sedimentation additives, biocides, fungicides, and the like, and combinations thereof. Preferably, in some embodiments, the additives in combination are included in an amount of no more than about 35.0 weight-percent of the solids content.

In one aspect, an internal binder, an adhesive binder, or a combination thereof can be added to the calcium sulfate hemihydrate slurry. An internal binder disperses in the slurry and later is deposited throughout the calcium sulfate dihydrate crystalline structure after set. Deposit of the internal binder throughout the interlocking calcium sulfate dihydrate crystals inhibits crack propagation within the crystalline structure. This allows the hardened three-dimensional plaster object formed from the inventive method to be dimensionally stable from room temperature to about 250° F. (about 121° C.). An adhesive binder increases the adhesive bond strength at the substrate/slurry interface or slurry/slurry interface. Exemplary internal and adhesive binders are well known in the art and are set forth in, for example, U.S. Pat. Nos. 6,355,099 and 7,374,611, both of which are herein incorporated by reference. If present, the internal binder, adhesive binder, or combination thereof, is included in an amount of from about 1.0 weight-percent to about 12.0 weight-percent of the calcium sulfate hemihydrate slurry.

An inert filler may be included in the calcium sulfate hemihydrate slurry to adjust the density of the three-dimensional plaster object. For example, the inert filler can be used to decrease the density of the three-dimensional plaster object. An exemplary inert filler is a surface coated, low-density fine perlite, such as Noble Perlite 200C (Akzo Nobel, the Netherlands). Other known inert fillers include calcium carbonate, graphite, resin microspheres, and the like. If present, the inert filler is included in an amount of from about 1.0 weight-percent to about 30 weight-percent of the solids content.

A defoamer may also be added to the calcium sulfate hemihydrate slurry. Defoamers are well known in the art and are used to decrease air entrainment in the slurry, therefore reducing air pockets in the composition after it is deposited. Numerous defoamers are commercially available and are suitable for use in the inventive method. For example, an exemplary defoamer includes FOAMASTER CN (Geo Specialty Chemicals, Ambler, Pa.). If present, the defoamer is included in an amount of from about 0.1 weight-percent to about 2.0 weight-percent of the calcium sulfate hemihydrate slurry.

Coloring agents, such as pigments, dyes or stains are also useful as additives in the method of the present invention. Any known coloring agent or combination of coloring agents can be added to the calcium sulfate hemihydrate slurry of the inventive method. For example, titanium dioxide and its derivatives are particularly useful to whiten the three-dimensional plaster object produced by the method of the present invention. If present, the coloring agent is included in an amount of from about 0.01 weight-percent to about 1.0 weight-percent of the calcium sulfate hemihydrate slurry.

A humectant or water retainer is optionally added to the calcium sulfate hemihydrate slurry for moisture retention. For example, humectants can be included in a situation where shape retention of the slurry is desired. Exemplary humectants include propylene glycol, polyethylene glycol, methoxypolypropylene glycol, and combinations thereof. The water retainer reduces water separation and bleed-off during the shelf life of the calcium sulfate hemihydrate slurry. Polyalkylene glycols also hold moisture while the slurry is being deposited. Any suitable water retainers as are known for use with gypsum or cement slurries or architectural paints can be used in the method of the present invention. Exemplary water retainers include starch and polyacrylamides. If present, the humectant is included in an amount of from about 0.01 weight-percent to about 1.0 weight-percent of the calcium sulfate hemihydrate slurry.

Rheology modifiers or thickeners are optionally added to the calcium sulfate hemihydrate slurry. Such additives allow for the adjustment of slurry surface properties and modify the rheology of the mixture composition for better workability and increased slump resistance. Examples of thickeners include modified cellulosics such as the BERMOCOLL products (Akzo Nobel, Stenungsund, Sweden), microparticle polymer suspensions such as MICROSPERSION (Micropowders, Inc., Tarrytown, N.Y.) and polymer micropowders such as the VINNAPAS products (Wacker Chemicals, Munich, Germany). If present, the rheology modifier is included in an amount of from about 0.01 weight-percent to about 5.0 weight-percent of the calcium sulfate hemihydrate slurry.

Another optional component of the calcium sulfate hemihydrate slurry is an antisedimentation additive. The antisedimentation additive reduces bleed off of the liquid as well as sedimentation of the solids in the slurry. For example, if desired, the antisedimentation additive can be included in situations where a premixed calcium sulfate hemihydrate slurry is employed, thus reducing the need to re-mix the slurry before deposition. Examples of antisedimentation additives include starches, modified starches, modified clays, such as modified smectite clays, silicates such as modified hydrous sodium lithium magnesium silicates, and mixtures thereof. If present, the antisedimentation additive is included in an amount of from about 0.01 weight-percent to about 5.0 weight-percent of the calcium sulfate hemihydrate slurry.

In certain aspects of the present invention, a biocide and/or fungicide is added to prevent mold or bacterial growth in the calcium sulfate hemihydrate slurry and the three-dimensional final product. The amount of biocide and/or fungicide will partially depend on the exact biocide selected. Examples of suitable fungicides and biocides are well known in the art and include, but are not limited to, TROYSAN 174 bactericide, (Troy Chemical Company, Floram Park, N.J.) and FUNGITROL 158 fungicide (Fritz Chemical Company, Houston, Tex.).

Example 1

This example demonstrates the production of a three-dimensional plaster cone via the method of the present invention.

An aqueous calcium sulfate hemihydrate slurry is prepared using the following ingredients:

| Ingredients | Amount (g) |
| --- | --- |
| Calcium sulfate hemihydrate | 4500.0 |
| Alcoquest 747 (set inhibitor and antisedimentation additive) | 30.7 |
| Tetrapotassiumpyrophosphate (set inhibitor) | 27.0 |
| Starpol 136 (humectant and rheology modifier) | 35.0 |
| Troysan 174 (bactericide) | 33.0 |
| Water | 1967.0 |

The aqueous components can be added to the water in a Hobart-type mixer. The dry materials are pre-blended in a twin-shell V-mixer and then added to the Hobart mixer with stirring. The resultant slurry material is blended until consistent and homogeneous and can then be used immediately or stored for future use.

A flat-blade joint compound knife can be used to spread the calcium sulfate hemihydrate slurry manually into the shape of a circle on a build platform of plastering wallboard. The slurry can be deposited in a thickness of about one millimeter or less. An activator (40% zinc sulfate solution in water) is then applied with a manual spray bottle to facilitate setting of the calcium sulfate hemihydrate to calcium sulfate dihydrate. Upon setting of the slurry, a second layer of calcium sulfate hemihydrate can be spread on top of the first layer in the manner described above in the shape of a slightly smaller, concentric circle. The second layer can then be activated with the zinc sulfate solution. The cycle of depositing concentrically smaller circle layers of slurry and activating the slurry can be repeated multiple time until a three-dimensional cone-shaped object is formed on the build platform. The cone can then be separated from the platform.

The use of the terms "a" and "an" and "the" and similar referents in the context of describing the invention (especially in the context of the following claims) are to be construed to cover both the singular and the plural, unless otherwise indicated herein or clearly contradicted by context. For example, when "an" ingredient is recited, it will be understood that more than one of the ingredient will be encompassed. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for producing a three-dimensional plaster object having a desired shape, the method comprising:
   (a) depositing a first layer of a calcium sulfate hemihydrate slurry that does not contain activating agents onto a support substrate in a predetermined pattern using a spray head, (b) activating the first layer of the calcium sulfate hemihydrate slurry by depositing at least one first activating agent on top of said first layer, (c) depositing a second layer of the calcium sulfate hemihydrate slurry on top of the first layer of the calcium sulfate hemihydrate slurry that was activated in step (b), (d) depositing at least one second activating agent on top of said second layer, wherein the first and second activating agents can be the same or different, (e) repeating steps (c) and (d) to form additional layers until the three-dimensional plaster object is formed, and (f) removing the three-dimensional plaster object from the support substrate, wherein the activating agents are present in amounts sufficient to accelerate the setting reaction of calcium sulfate hemihydrate and water to form set calcium dihydrate;

wherein the layers of calcium sulfate hemihydrate slurry are deposited in thicknesses of about 0.01 mm to about 1.0 mm;

and wherein no machining is required to form the plaster object into the desired shape.

2. The method of claim 1, wherein the calcium sulfate hemihydrate slurry further comprises a binder, a flow modifier, a water retainer, a rheology modifier, an anti-sedimentation additive, a biocide, a fungicide, or combinations thereof.

3. The method of claim 1, wherein the calcium sulfate hemihydrate slurry further comprises a calcium sulfate hemihydrate set inhibitor, wherein the calcium sulfate hemihydrate set inhibitor is present in an amount sufficient to deactivate the setting reaction of calcium sulfate hemihydrate and water to form set calcium sulfate dihydrate.

4. The method of claim 3, wherein the calcium sulfate hemihydrate slurry further comprises a binder, a flow modifier, a water retainer, a rheology modifier, an anti-sedimentation additive, a biocide, a fungicide, or combinations thereof.

5. The method of claim 3, wherein the calcium sulfate hemihydrate set inhibitor is present in an amount of about 0.01 to about 2.00 weight-percent.

6. The method of claim 3, wherein the calcium sulfate hemihydrate set inhibitor is selected from a group consisting of low molecular weight polymers or copolymers of vinyl acrylates, vinyl acetates, vinyl chlorides, ethylene, styrene, substituted ethylene, and substituted styrene, and polyphosphonic compounds, and combinations thereof.

7. The method of claim 6, wherein the calcium sulfate hemihydrate set inhibitor is a polyphosphonic compound selected from a group consisting of tetrasodiumpyrophosphate, tetrapotassiumpyrophosphate, hexamethylene diamine tetra(methylene phosphonic acid), and combinations thereof.

8. The method of claim 1, wherein the first activating agent and the second activating agent are aqueous solutions or slurries comprising at least one salt, wherein the cation of the at least one salt is selected from a group consisting of aluminum, zinc, iron, an alkali metal, and an alkaline earth metal.

9. The method of claim 8, wherein the anion of the at least one salt is sulfate or chloride.

10. The method of claim 9, wherein the at least one salt is selected from a group consisting of aluminum sulfate, zinc sulfate, sodium sulfate, potassium sulfate, and calcium sulfate.

* * * * *